United States Patent [19]
Cohen et al.

[11] Patent Number: 5,717,165
[45] Date of Patent: Feb. 10, 1998

[54] APPARATUS AND METHOD FOR POSITIONING AND ISOLATING A PRINTING MECHANISM IN A MAIL HANDLING MACHINE

[75] Inventors: Steven E. Cohen, Seymour, Conn.;
Dean H. Foster, Brewster, Mass.;
James A. Salomon, Cheshire, Conn.

[73] Assignee: Pitney Bowes Inc., Stamford, Conn.

[21] Appl. No.: 542,578

[22] Filed: Oct. 13, 1995

[51] Int. Cl.⁶ .................... G01G 23/38; G01G 13/02; G01G 19/00; B65G 69/00

[52] U.S. Cl. .................... 177/2; 177/2; 177/119; 177/145; 217/198; 217/200; 217/275; 209/900; 414/21; 414/753

[58] Field of Search ............... 177/2, 119, 145; 414/21, 753; 217/275, 200, 198; 209/900

[56] References Cited

U.S. PATENT DOCUMENTS 3,811,522  5/1974  Wolf et al. ............... 177/13
5,190,115  3/1993  Dolan et al. ............. 177/25.15
5,288,994  2/1994  Berson .................... 250/223 R
5,339,102  8/1994  Carlotta .................. 347/32

*Primary Examiner*—Michael L. Gellner
*Assistant Examiner*—Anh Mai
*Attorney, Agent, or Firm*—Steven J. Shapiro; Melvin J. Scolnick

[57] ABSTRACT

An apparatus has a transport mechanism for transporting mailpieces to a printing and weighing station. The apparatus also includes a weighing device; a printing mechanism operatively associated with the weighing device to form the printing and weighing station; a carriage assembly moveably mounted in the apparatus, the printing mechanism removeably supported on the carriage assembly to move therewith between the printing and weighing station and at least a second station; and structure to transfer complete support of the printing mechanism from the carriage assembly to the weighing device during movement of the printing mechanism into the printing and weighing station.

9 Claims, 6 Drawing Sheets

APPARATUS AND METHOD FOR POSITIONING AND ISOLATING A PRINTING MECHANISM IN A MAIL HANDLING MACHINE

BACKGROUND

This invention relates to an apparatus and method for positioning a printing mechanism, and more particularly to an apparatus for positioning and isolating a printing mechanism to enable and expedite weighing of a mailpiece in a mail handling machine.

Mail handling machines, such as that described in U.S. Pat. No. 4,935,078, process mixed mailpieces (varying size) in a high speed manner. These known mail handling machines typically include a front end feeder, a singulator, a moistener, a sealer, and a printing device. The front end feeder shingles the incoming mailpieces (such as envelopes) and the singulator grabs the bottom envelope from the shingled stack of envelopes for subsequent processing downstream. Upon passing by the singulator, the envelope is successively fed past the moistener where its flap portion is moistened and is then passed through a sealer where the flap is sealed prior to the printing of, for example, postage values thereon by the printing device (postage meter). Moreover, the mail handling machine may further include a scale for weighing the mailpieces prior to printing as they are being processed through the mail handling apparatus and a tape mechanism for printing of indicia on a tape.

Modern mail handling machines utilize digital printing techniques for producing images on a mailpiece being processed therethrough. Conventional digital printing techniques include bubble jet, piezoelectric ink jet, and thermal ink transfer which each produce an image in a dot matrix pattern. In digital printing individual printhead elements (such as resistors or piezoelectric elements) are selectively electronically stimulated to either expel drops of ink from a reservoir onto a substrate (bubble jet, ink jet) or to transfer ink from a ribbon to a substrate via contact with the ribbon (thermal). By controlling the timing of the energizing of the individual printhead elements in conjunction with the relative movement between the printhead and the mailpiece, a dot matrix pattern is produced in the visual form of the desired indicia.

Digital printing technology has significant advantages when used in a mail handling apparatus as compared to older technology which utilized either a flat platen or a rotary drum to imprint indicia on mailpieces. For example, if the indicia image needs to be changed, it can easily be done through the installation of new or upgraded software versus having to replace the flat platen or rotary drum. Moreover, greater printing speeds can be obtained as compared to conventional mechanical printing systems. However, the use of a digital printhead in a mail handling apparatus presents special operational requirements relative to the positioning of the printhead during printing which must be achieved in order to ensure that the printhead produces an indicia of acceptable quality. That is, for many digital printing technologies the distance between the printhead nozzles and the surface of the substrate being printed upon must be held within very tight tolerances in order to obtain acceptable image quality. The ability to position the printhead within such tolerances is complicated by the fact that the printhead cannot simply be set in a single fixed position because during periods of non-printing, it must be moved from a printing position to a maintenance position. In the maintenance position the printhead typically engages with a maintenance station where it is serviced (wiped, purged, vacuum applied) and hermetically capped to prevent clogging of the individual nozzles due to contaminants and/or dried ink. The printhead typically remains engaged within the maintenance station during non-printing periods and is moved to the printing position when printing is required. Proper positioning of the printhead is required for each action.

The printhead in a digital mail handling apparatus is moved by a carriage that transports it between the printing position and the maintenance position. The carriage is operatively connected to the mechanical ground (such as the base) of the mail handling apparatus. The scale which is used to weigh the mailpiece being transported through the mail handling apparatus is isolated together with the mail transport mechanism from the mechanical ground, and therefore the printhead cannot contact both the carriage and the scale at the same time during the weighing process or an inaccurate weight will be obtained by the scale. Additionally, mailpiece throughput requirements do not allow the printhead to move to the printing position just after weighing and before printing starts. Thus, the printhead is typically suspended over the scale during both weighing and printing. Utilizing the suspension approach requires a significant separation to avoid contact between the tare of the scale with the carriage and printhead (ground), and necessitates adjustments to be made to the printhead position during assembly and servicing. The adjustments are required due to the tight tolerances previously discussed and the ability of the scale to move since it is isolated from the mechanical ground by being mounted on flexible members. The need for adjustments reduces apparatus reliability and increases manufacturing and service time. Thus, what is needed is a mail handling apparatus utilizing digital printhead technology and having a mechanism for positioning the printhead for printing and weighing which overcomes the problems discussed above in the prior art devices.

SUMMARY OF THE INVENTION

It is an object of the invention to provide a mail handling apparatus having a mechanism for handing off its printhead to sit on the tare weight of a weighing device thereby disassociating the printhead and the tare weight of the weighing device from the printhead carriage and from the mechanical ground It is yet another object of the invention to properly align the printhead when it is moved into the printing position and minimize the need for printhead positioning adjustments during servicing.

It is another object of the invention to increase throughput of mailpieces in a mail handling machine having an in line weighing station.

These objects are met by an apparatus having a transport mechanism for transporting mailpieces to a printing and weighing station, the apparatus including a weighing device; a printing mechanism operatively associated with the weighing device to form the printing and weighing station; a carriage assembly moveably mounted in the apparatus, the printing mechanism removeably supported on the carriage assembly to move therewith between the printing and weighing station and at least a second station; and structure to transfer complete support of the printing mechanism from the carriage assembly to the weighing device during movement of the printing mechanism into the printing and weighing station.

Yet another object is to provide a method for positioning a printing mechanism in a mail handling apparatus having a weighing device, a printing mechanism, a moveable carriage assembly on which the printing mechanism is removeably supported, a weighing station and printing station, and a second station. This object is met by a method including moving the carriage assembly together with the printing mechanism from the second station to the weighing and printing station; and transferring complete support of the printing mechanism from the carriage assembly to the weighing device during movement of the printing mechanism into the printing and weighing station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
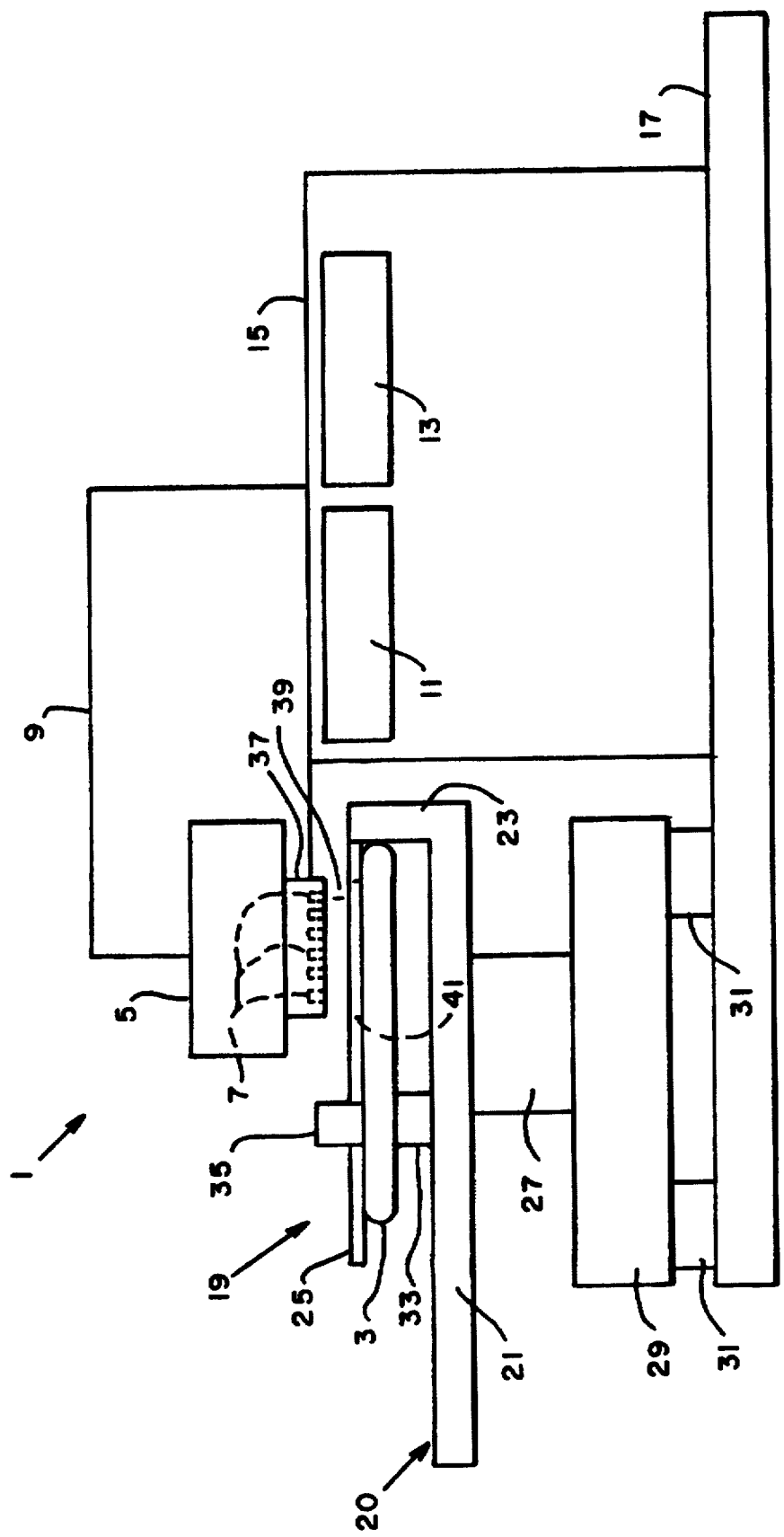
FIG. 1 is a schematic view of the inventive apparatus.

FIG. 1 schematically shows a portion of a mail handling apparatus 1 looking directly opposite to the direction of flow of a mailpiece 3 through the mail handling apparatus 1. A printhead 5, having a plurality of nozzles 7 through which ink is ejected, is mounted on a carriage assembly 9 to move therewith such that the printhead 5 is positionable between the mailpiece printing position of FIG. 1 and a tape printing station 11 and a maintenance station 13. Tape printing station 11 provides postal tape in a conventional manner to a position below printhead 5 for subsequent printing on the tape by printhead 5. Maintenance station 13 is a conventional maintenance station which provides various servicing functions to the printhead 5 during positioning of printhead 5 at the maintenance station when no printing is occurring. Carriage 9 is shown as being moveably mounted to a frame 15 which is fixedly mounted to a base 17 (referred to as mechanical ground). The maintenance station 13 and tape printing station 11 are representative examples of the second station which together with the weighing and printing station (location of printhead 5 in FIG. 1) define therebetween a path along which the printhead 5 is movable.

A weighing apparatus is generally shown at 19. Weighing apparatus 19 includes a registration tray 20 having a horizontal portion 21, a vertical portion 23, and a horizontal shield plate 25; a load cell 27 connected in a conventional manner to horizontal portion 21; a sub-frame 29 connected to load cell 27; and isolation members 31 connected to sub-frame 29 and base 17 such that the tare weight of registration tray 20 is vibrationally isolated from vibrations base 17. The arrangement of registration tray 20, load cell 27, sub-frame 29 and base 17 is conventional in order to allow weighing of the mailpiece 3. Examples of conventional weighing apparatus are set forth in U.S. Pat. Nos. 4,856,602, 4,778,018, 4,848,492, 5,190,115, and 4,844,188, which are all hereby incorporated by reference.

Registration tray 20 has at least one spring loaded ski 33 mounted thereto in a conventional manner for biasing mailpiece 3 against the bottom surface of shield plate 25 during transport of mailpiece 3 to the printing and weighing position. A belt 35 driven in a conventional manner extends through shield plate 25 for moving the mailpiece 3 into and past the weighing and printing position due to its interaction with ski 33. Thus, when weighing of mailpiece 3 occurs, the weight of ski 33 and belt 35 is included as part of the tare weight of the weighing apparatus, the tare weight being isolated from base 17. The term "isolated" in this specification means that the tare weight is free from and not impacted by base 17 such that any difference between the tare weight and the weight sensed by the load cell is attributable to the weight of the mailpiece.

FIG. 1 shows the positional relationship of printhead 5 relative to shield plate 25 and the top surface of mailpiece 3 in the mailpiece printing position. As shown, printhead 5 includes an orifice plate 37 in which nozzles 7 are disposed. A gap 39 exists between the top of shield plate 25 and the bottom of orifice plate 37 to ensure that no damage occurs to the nozzles 7 during printing and allows proper drop formation and print quality. Furthermore, the thickness of shield plate 25 is fixed so that the total distance from the bottom surface of shield plate 25 to orifice plate 37 is fixed, and correspondingly the distance between the top surface of mailpiece 3 and the bottom surface of orifice plate 37 when mailpiece 3 is registered against the bottom surface of shield plate 25 by ski 33. This fixed distance ensures that as ink is projected from nozzles 7, through an opening 41 in shield plate 25, onto mailpiece 3, an acceptable quality image is produced. If the distance between the print surface of mailpiece 3 and nozzles 7 is too large, drop placement errors are produced due to inaccurate drop trajectories.

Figure 2:
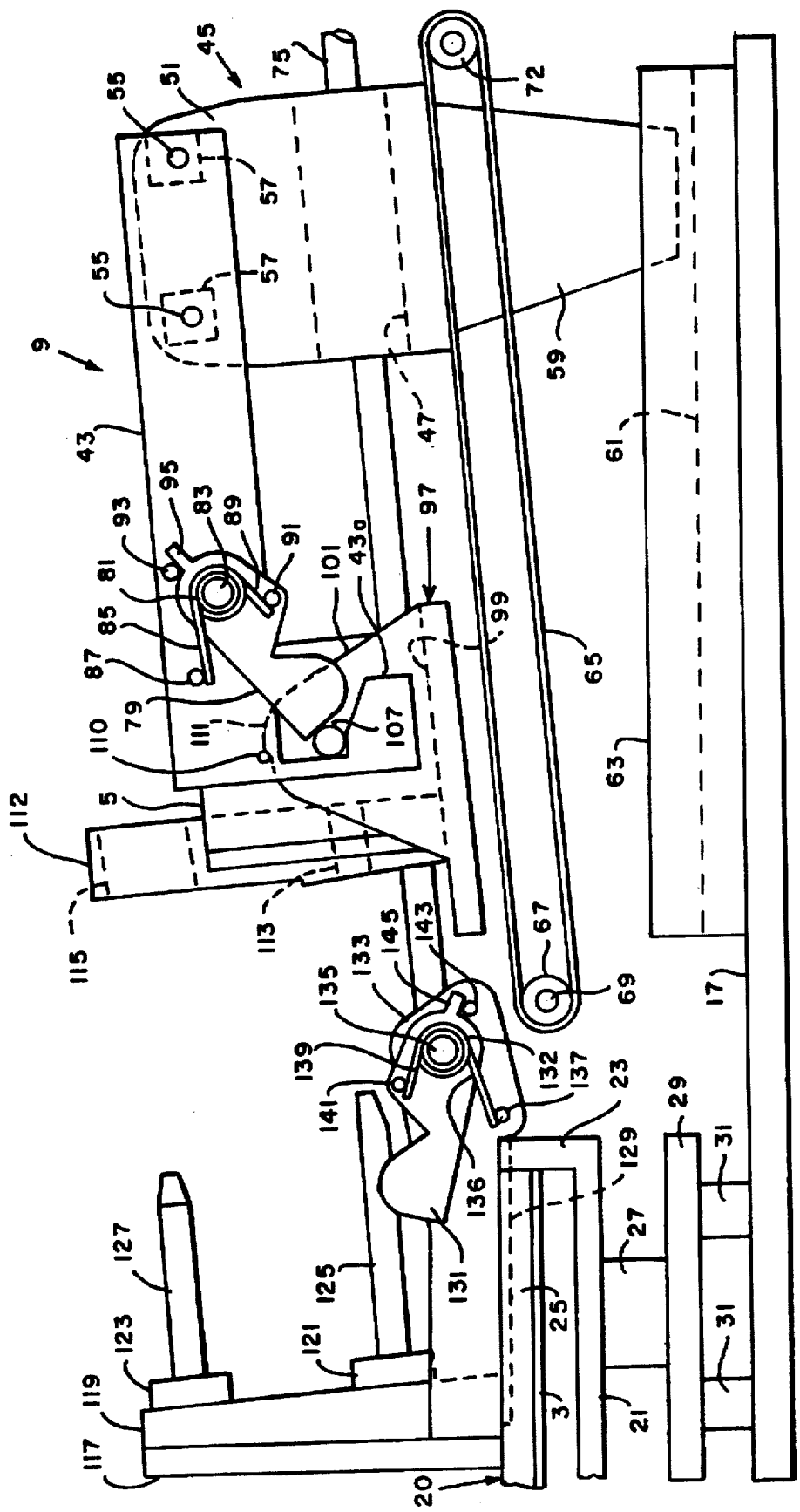
FIG. 2 is a more detailed front view of the apparatus of FIG. 1 showing the printhead in a non-printing position.
Figure 3:
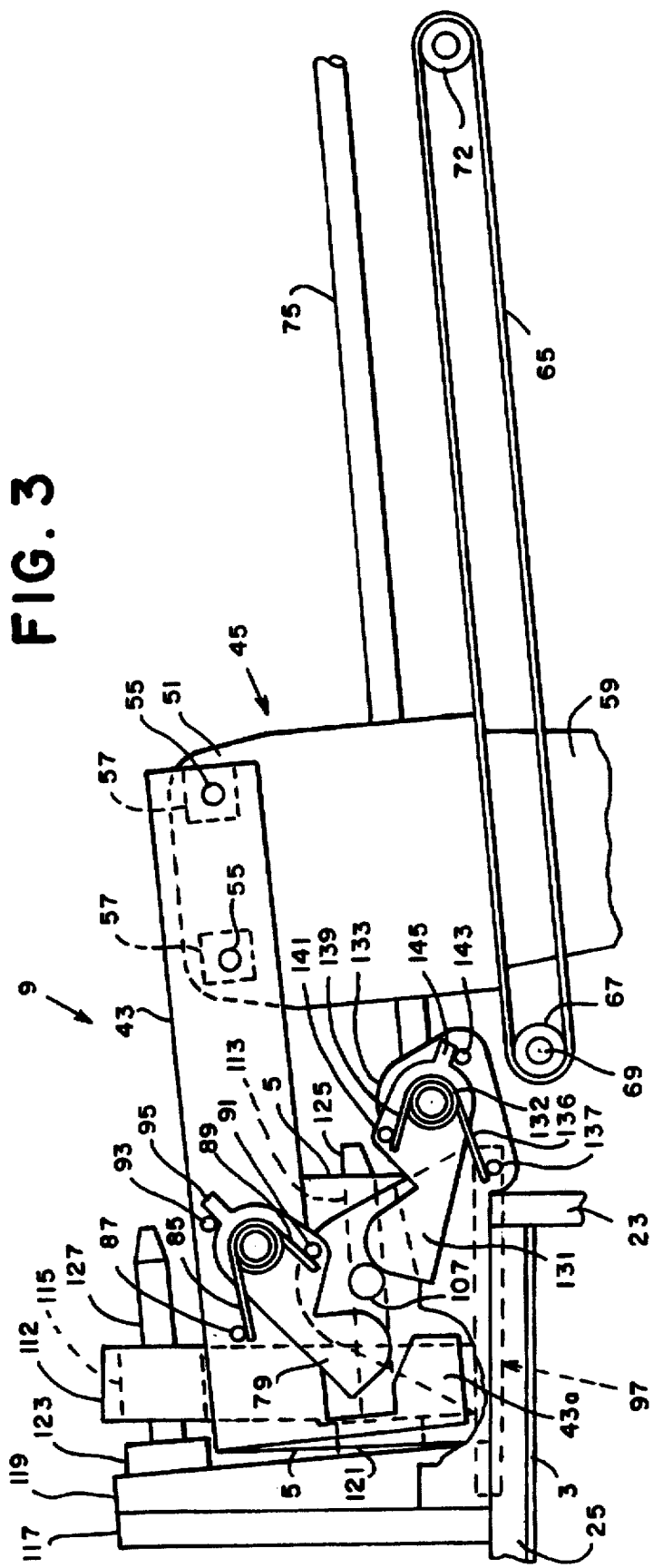
FIG. 3 is a view similar to FIG. 2 but showing the printhead in the mailpiece printing position.
Figure 4:
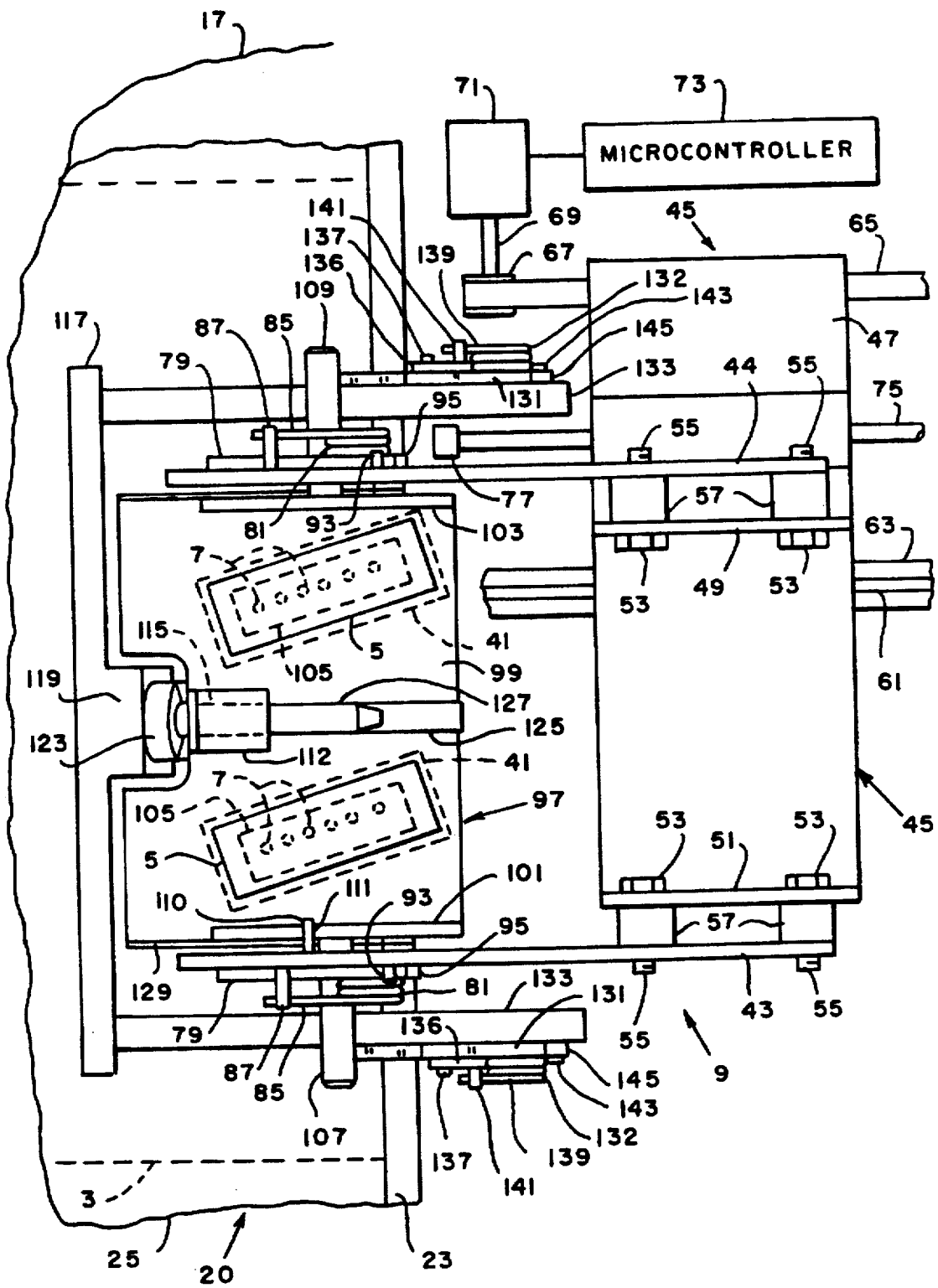
FIG. 4 is a top plan view of FIG. 3.

Referring to FIGS. 2, 3 and 4, the inventive apparatus is shown in more detail. FIG. 2 shows the printhead 5 moved out of the mailpiece printing position, while FIGS. 3 and 4 show the printhead engaged in the mailpiece printing position. As previously discussed, printhead 5 is moveable between the mailpiece printing position of FIGS. 3 And 4 and a position remote therefrom, such as the position of FIG. 2, via the movement of carriage 9. FIG. 2 does not show either the tape station 11 or maintenance station 13, but one skilled in the art recognizes that such stations can be positioned along the path of travel of printhead 5 from the position of FIGS. 3 and 4 toward the position of FIG. 2.

Carriage 9 includes a pair of latch arms 43, 44 and a latch arm support structure 45 having a bottom portion 47 and a pair of vertically extending walls 49, 51. Latch arms 43, 44 are respectively flexibly mounted to walls 49, 51 via, for example, a conventional nut 53, bolt 55, and spacer 57 arrangement at a plurality of positions shown. Moreover, latch arm support structure 45 has a leg 59 extending from the underside of bottom portion 47 which rides within a slot 61 of a guide 63 fixedly connected to base 17.

Bottom portion 47 is connected to an endless belt 65. Belt 65 passes around a pulley 67 which is connected to a shaft 69 of a motor 71. Belt 65 also passes around a free wheeling pulley 72 which is conventionally mounted to base 17 and which is located at an end thereof opposite to pulley 67. Motor 71 is controlled by a mailing machine microcontroller 73 such that when motor 71 is energized in either of two directions, belt 65 moves over pulleys 67, 72 carrying carriage 9 and printhead 5 therewith between the positions of FIGS. 2 and 3. Additionally, to provide support to carriage 9 as it is moved by belt 65, it is mounted to slide around a guide bar 75 supported by a column 77 extending from base 17 at one end and a similar column (not shown) at another end. Thus, while guide bar 75 fixes the position of carriage 9 both in the vertical direction and the direction extending between latch arms 43,44, leg 59 prevents rotation of carriage 9 about guide bar 75 due to its close tolerance fit within slot 61 of guide 63.

Latch arms 4e, 44 each have an identical cam 79 and spring 81 attached thereto and thus only a description of one is provided herein. Spring 81 is conventionally mounted around a first post 83 extending from latch arm 43. A first free end 85 of spring 81 abuts against a second post 87 extending from latch arm 43 and a second free end 89 of spring 81 abuts against a post 91 extending from cam 79. The configuration of posts 93, 87, 91, cam 79 and spring 81 biases cam 79 in the counterclockwise direction as viewed in FIG. 2. A third post 93 extending from latch arm 43 acts as a stop by abutting against an extending finger 95 of cam 79.

Printhead 5 (in the preferred embodiment two printheads 5 are shown but the discussion of one is equally applicable to the other, moreover the invention is applicable to any multiplicity of printheads 5) is mounted on printhead platform 97. Platform 97 is generally U-shaped to include a horizontal base 99 and two opposing vertically upstanding supports 101, 103. Printhead 5 is mounted in a conventional manner on base 99 so that nozzles 7 are aligned with openings 105 in base 99 thereby allowing ink which is expelled from nozzles 7 to pass through openings 105 and opening 41, and onto mailpiece 3 when printhead 5 is in the mailpiece printing position of FIGS. 3 and 4. A pair of posts 107, 109 respectively extend outward (and which act as followers on cams 79, 131) from supports 101, 103. In the position of FIG. 2, posts 107, 109 are each disposed in respective C-shaped end portions 43a of latch arms 43, 44 (only the C-shaped end portion of latch arm 43a is shown) and are retained in place by corresponding cam 79 and the biasing force of corresponding spring 81. Thus, in the position of FIG. 2, platform 97 with printheads 5 mounted thereon is carried by carriage 9. Moreover, to prevent rotation of platform 97, a pin 110 extending from latch arm 43 interferes with a notch 111 in support 101. Therefore, platform 97 is securely carried by latch arms 43, 44.

Platform 97 further includes a guiding structure 112 extending upward from base 99. Guiding structure 112 can be formed as an integral part of base 99 or can be a separate component connected thereto in a conventional manner. Guiding structure 112 has a pair of through openings 113, 115, the purpose of which is discussed in more detail below.

Shield plate 25 has a T-shaped wall structure 117 mounted thereto which extends upward therefrom. A central portion 119 of T-shaped wall structure 117 includes first and second bosses 121, 123 extending therefrom. Guide posts 125, 127 respectively extend from first and second bosses 121, 123 and respectively enter through openings 113, 115 during printhead 5 movement as discussed in more detail below. Shield plate 25 further includes a recessed portion 129 to ensure there is sufficient clearance between orifice plate 37 and shield plate 25 when printhead 5 is moved into the mailpiece printing position.

A second set of cams 131 and springs 132 are mounted on a respective wail 133 extending from shield plate 25. Spring 132 is conventionally mounted around a first post 135 extending from wall 133. A first free end 136 of spring 132 abuts against a second post 137 extending from wall 133 and a second free end 139 of spring 132 abuts against a post 141 extending from cam 131. The configuration of the posts 135, 137, 141, cam 131 and spring 132 biases cam 132 in the clockwise direction as viewed in FIG. 2. A third post 143 extending from wall 133 acts as a stop by abutting against an extending finger 145 of cam 131.

Figure 5A:
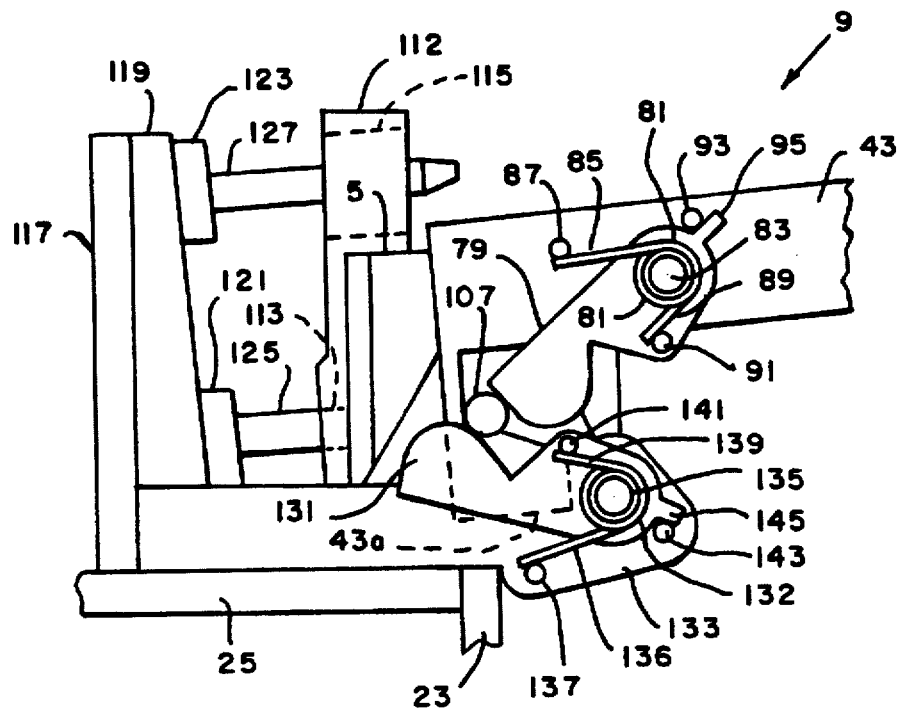
FIGS. 5(a), 5(b), 5(c), and 5(d) show a sequence of positions of the printhead and cams as the printhead moves from the non-printing position toward the printing position.

With reference to FIGS. 2, 3, and 5(a), 5(b), 5(c), and 5(d), a description of the operation of the inventive apparatus as printhead 5 is moved from the position of FIG. 2 to the mailpiece printing position of FIG. 3 is set forth herein below. As previously discussed, when printhead 5 is in the position of FIG. 2, it is located remote from the mailpiece printing position. Thus, when it is necessary to print on a mailpiece, microcontroller 73 energizes motor 71 causing a corresponding movement of belt 65 around pulleys 67, 72. Belt 65 carries carriage 9 therewith in the direction of weighing apparatus 19. As carriage 9 is moved, it reaches the position shown in FIG. 5(a) where post 107 contacts both cam 79 and cam 131. At this point in time, cams 79 and 131 are each exerting a force on post 107 which act in opposition to each other. However, the physical design of cam 79, the biasing force of spring 81 and the orientation of cam 79 and spring 81 relative to post 107 causes a greater force to be exerted on post 107 than the force created by the combination of the physical design of cam 131, the biasing force of spring 132 and the relative orientation of cam 131 and spring 132 to post 107. Accordingly, as carriage 9 continues to move toward weighing apparatus 19, cam 131 is forced to rotate in the counterclockwise direction due to the load exerted by post 107. FIG. 5(a) also shows that openings 113 and 115 of guiding structure 112 have respectively received posts 125, 127 therein to help guide platform 97 into the final printing position. Posts 125, 127 are slightly angled relative to the horizontal plane and the throughholes 113, 115 are inclined at the same angle. Moreover, opening 113 has a close tolerance fit with the outside diameter of post 125 to minimize movement of platform 97 in both the vertical and horizontal directions. Opening 115 on the other hand has a close tolerance fit to the outside diameter of post 127 along the horizontal plane, but is oversized in the vertical direction relative to the outside diameter of post 127. Opening 115 therefore serves the primary function of preventing rotation of platform 97 around post 125. It is readily apparent to one possessing ordinary skill in the art that the orientation and configuration of posts 125, 127 and through openings 113, 115 can be adapted in many different ways to accommodate any desired position of printhead 5.

Figure 5B:
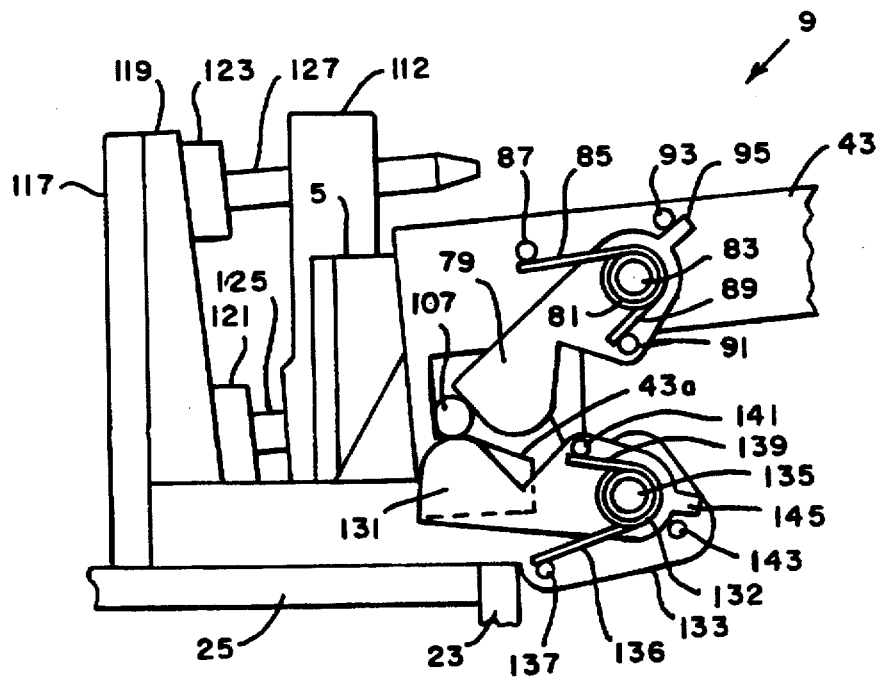

FIG. 5(b) shows an intermediate position of the cams 79, 131 just prior to guiding structure 112 making contact with boss 121. In this position, post 107 has forced cam 131 to rotate such that post 107 is disposed on a top rounded portion of cam 131. Cam 79 keeps platform 97 latched by applying a biasing force to post 107. It is to be noted that the movement of cams 79, 131 and the force exerted by each cam 79, 131 on post 107 is a function of the cam profile.

Figure 5C:
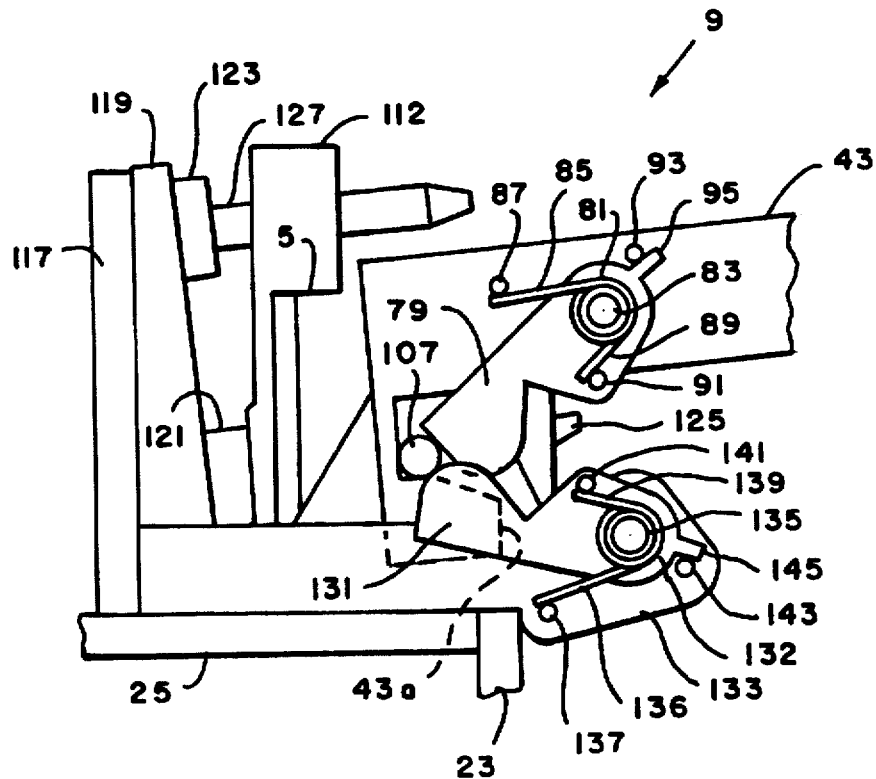

FIG. 5(c) shows the position wherein carriage 9 has moved guiding structure 112 into initial contact with boss 121. Thus, as carriage 9 continues to move toward weighing apparatus 19, it is not possible for platform 97 to continue moving therewith. In the position of FIG. 5(c), both cams 79 and 131 are applying a force to post 107.

Figure 5D:
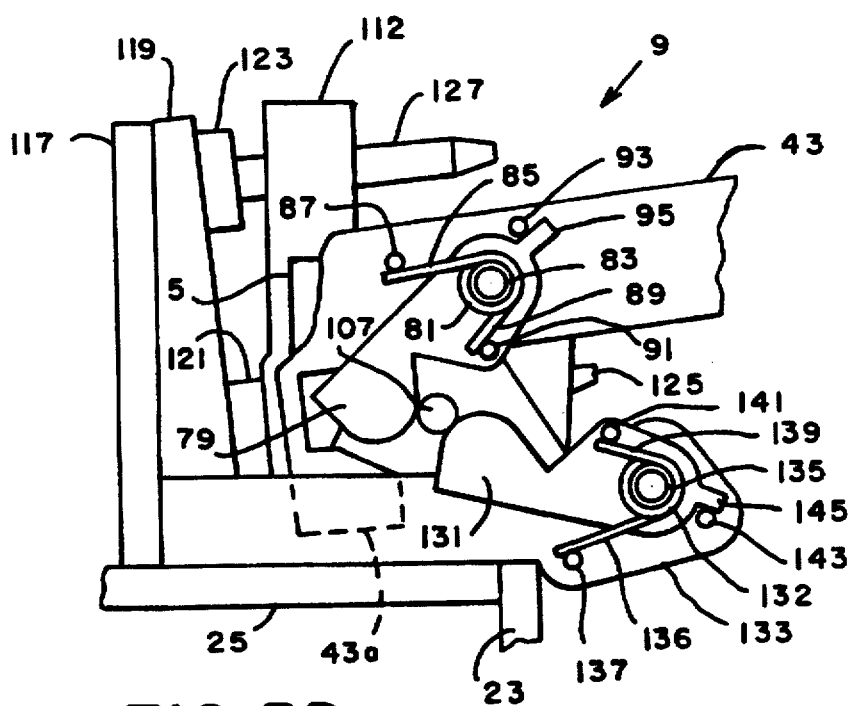

In FIG. 5(d), carriage 9 has moved even closer to wall structure 117. However, since guiding structure 112 is prevented from further movement by boss 121, the force exerted by cam 79 on post 107 is overcome thereby forcing cam 79 to rotate in the clockwise direction and permitting carriage arm 43 to move free from post 107. Cam 131 however, still applies a biasing force to post 107.

FIG. 3 shows the apparatus in the mailpiece printing position. As shown, cam 79 and carriage arm 43 are completely free from post 107 and platform 97 such that platform 97 is no longer carried by carriage 9. Rather, cam 131 applies a force against post 107 such that platform 97 is secured in place between cam 131 and boss 121 securing printhead 5 in the desired printing position. Since platform 97 together with the printhead 5 is now carried by weighing apparatus 19, the weight of these structures can be included as part of the overall weighing apparatus 19 tare weight in order to enable accurate weight measurement of mailpiece 3. Put in another way, due to the interaction of the cams 79 and 131, the weight associated with the platform 97 and printheads 5 has effectively been transferred from being supported by carriage arm 43 and base 17 (mechanical ground), to being completely supported by weighing apparatus 19 which is isolated from base 17.

While not shown, the operation of the apparatus is such that when printhead 5 is to be placed back into the remote position of FIG. 2, carriage 9 is moved in that direction forcing the cams 131 and 79 to interact in the reverse manner to that discussed above such that the weight of platform 97 and printhead 5 is transferred from being supported by weighing apparatus 19 to being supported by carriage 9. Thus, it is clear to one possessing ordinary skill in the art that when carriage 9 moves back toward the position of FIG. 2 the profiles of cams 79 and 131 are such that cam 131 produces a force on post 107 which is greater than the force of cam 79 on post 107. However, when carriage arm 9 moves in the reverse direction toward the printing position the force of cam 79 on post 107 is greater than the force of cam 131 on post 107.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. An apparatus having a transport mechanism for transporting mailpieces to a printing and weighing station from a second station, the apparatus comprising:

a weighing device;

a printing mechanism operatively associated with the weighing device to form the printing and weighing station;

a carriage assembly moveably mounted in the apparatus, the printing mechanism removeably supported on the carriage assembly to move therewith between the printing and weighing station and at least the second station; and means for transferring complete support of the printing mechanism from the carriage assembly to the weighing device during movement of the printing mechanism into the printing and weighing station.

2. An apparatus as set forth in claim 1, further comprising a base and means for isolating the tare weight of the weighing device from the base, and wherein the carriage assembly is moveably mounted to the base such that at times when the printing mechanism is completely supported by the weighing device the weight of the printing mechanism is included as part of the tare weight of the weighing device.

3. An apparatus as set forth in claim 2, wherein the means for transferring includes first and second cams respectively connected to the weighing device and the carriage assembly.

4. An apparatus as set forth in claim 3, further comprising a platform to which the printing mechanism is mounted, and wherein the carriage assembly includes at least one carriage arm which supports the platform during movement of the carriage assembly, the second cam secures the platform within the at least one carriage arm, and the first and second cams interact with each other during movement of the printing mechanism into the printing and weighing station such that the platform is freed from contact with the at least one carriage arm and the second cam and is completely supported by the weighing device and secured thereto by the first cam.

5. An apparatus as set forth in claim 4, wherein the weighing device includes a wall extending therefrom which interferes with the platform as the carriage assembly moves the printing mechanism moves into the printing and weighing station thereby causing the second cam and the at least one carriage arm to move out of contact with the platform.

6. A method for positioning a printing mechanism in a mail handling apparatus having a weighing device, a printing mechanism, a moveable carriage assembly on which the printing mechanism is removeably supported, a weighing and printing station, and a second station, the method comprising the steps of:

moving the carriage assembly together with the printing mechanism from the second station to the weighing and printing station;

transferring complete support of the printing mechanism from the carriage assembly to the weighing device during movement of the printing mechanism into the printing and weighing station.

7. The method as set forth in claim 6, wherein the mail handling apparatus includes a base and the carriage assembly is moveably mounted to the base, and further comprising isolating the tare weight of the weighing device from the base such that when the transferring step has been completed the weight of the printing mechanism is included as part of the tare weight of the weighing device.

8. The method as set forth in claim 7, wherein the second station is one of a tape printing station and a maintenance station.

9. The apparatus as set forth in claim 1, wherein the second station is one of a tape printing station and a maintenance station.

* * * * *